United States Patent
Koschberg et al.

(10) Patent No.: US 8,319,160 B2
(45) Date of Patent: Nov. 27, 2012

(54) GALLEY OVEN FOR PREPARING FOOD ON BOARD AN AIRCRAFT

(75) Inventors: Stefan Koschberg, Ostseebad Nienhagen (DE); Marco Mundt, Heiligengrabe (DE)

(73) Assignee: Airbus Operations GmbH, Hamburg (DE)

( * ) Notice: Subject to any disclaimer, the term of this patent is extended or adjusted under 35 U.S.C. 154(b) by 411 days.

(21) Appl. No.: 12/640,524

(22) Filed: Dec. 17, 2009

(65) Prior Publication Data
US 2010/0155391 A1    Jun. 24, 2010

Related U.S. Application Data

(60) Provisional application No. 61/203,221, filed on Dec. 19, 2008.

(30) Foreign Application Priority Data

Dec. 19, 2008   (DE) .......................... 10 2008 064 070

(51) Int. Cl.
*H05B 6/12* (2006.01)

(52) U.S. Cl. ....................................................... 219/621
(58) Field of Classification Search .................. 219/621, 219/622, 634, 676
See application file for complete search history.

(56) References Cited

U.S. PATENT DOCUMENTS

| | | | |
|---|---|---|---|
| 5,403,997 A | | 4/1995 | Wimpee et al. |
| 6,097,014 A | * | 8/2000 | Kirsch ........................... 219/621 |
| 2010/0301037 A1 | * | 12/2010 | Wust ............................. 219/620 |

FOREIGN PATENT DOCUMENTS

| | | |
|---|---|---|
| GB | 2 300 702 | 11/1996 |
| WO | WO 2005/084503 | 9/2005 |
| WO | WO 2007/096000 | 8/2007 |

* cited by examiner

*Primary Examiner* — Calvin Lee
(74) *Attorney, Agent, or Firm* — Krieg DeVault, LLP

(57) ABSTRACT

A galley oven (10) for preparing food on board an aircraft comprises a housing (12) and a rack (18) which is introducable into the housing (12) and removable from the housing (12). The rack (18) comprises a plurality of receiving devices (24) for receiving food containers (26) that are to be heated in the galley oven (10).

10 Claims, 6 Drawing Sheets

GALLEY OVEN FOR PREPARING FOOD ON BOARD AN AIRCRAFT

CROSS REFERENCE TO RELATED APPLICATIONS

Figure 1:
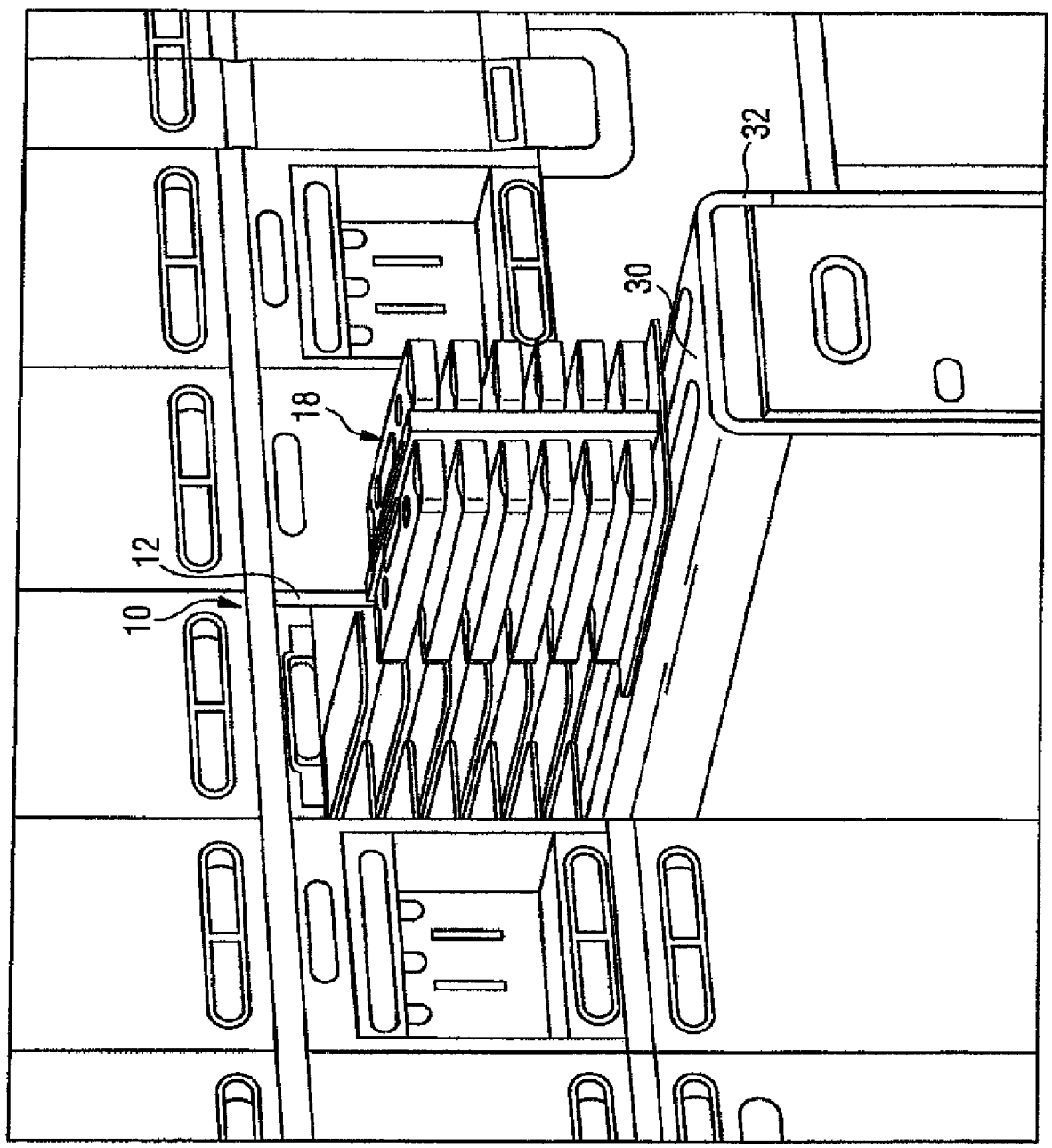

The present application claims priority to German Patent Application No. 10 2008 064 070.0, filed Dec. 19, 2008 and claims the benefit of U.S. Provisional Patent Application No. 61/203,221, filed Dec. 19, 2008, each of which is incorporated herein by reference.

The present invention relates to a galley oven for preparing food on board an aircraft.

At present, for preparing hot meals for the passengers on board passenger aircraft it is customary to use steam-, convection- or induction ovens that are disposed in the galleys of the aircraft. These ovens comprise a housing, the interior of which is sub-divided into a plurality of planes by means of shelves that are formed integrally with the housing. In induction ovens the induction coils for generating the eddy currents are disposed in the shelves and during operation of the ovens effect the heating of the food introduced into the ovens. Galley ovens that are currently used in passenger aircraft have the drawback that the ready meals supplied by a catering service have to be inserted into the ovens and removed from the ovens individually by the flight crew. Loading and unloading of the ovens is therefore very time-consuming, the result being that crew members occupied with loading and unloading the ovens are unavailable to carry out services for the passengers for an extended period. There is further the risk that during the loading and unloading of the ovens, which is often done under time pressure, the crew members may burn themselves on hot surfaces of the ovens.

The underlying object of the invention is to provide a simple, time-saving and safely operable galley oven for preparing food on board an aircraft.

In order to achieve this object, a galley oven according to the invention for preparing food on board an aircraft comprises a housing of a for example cuboidal construction. The housing is preferably designed so as to be capable of integration in an aircraft galley of a modular design. The galley oven according to the invention further comprises a rack, which is introducable into the housing and removable from the housing and comprises a plurality of receiving devices for receiving food containers that are to be heated in the galley oven. The galley oven according to the invention has the advantage that there is no longer any need for the food containers, which are to be heated in the oven, to be individually inserted into and removed from the oven. Instead, the rack may be filled outside of the oven with the food containers to be heated and then inserted into the housing of the galley oven. Filling of the rack may even be effected outside of the aircraft and be carried out for example by a catering service that supplies the ready meals provided for consumption on board the aircraft. Alternatively, the rack may be filled on board the aircraft by the flight crew, it being much easier and hence less time-consuming to fill a rack that is disposed outside the oven and is therefore easily accessible than to fill an occasionally already hot oven. Furthermore, when the food containers to be heated are introduced into the rack, which is disposed outside of the oven and is therefore cold, there is no risk of burn injuries. The removal of heated food containers from the oven is also much easier with the oven according to the invention than with ovens of prior art because a large number of food containers may be removed simultaneously from the oven with the aid of the rack.

The rack of the galley oven according to the invention preferably comprises a guide device, which is adapted so as to interact with a complementary guide device. The complementary guide device may be provided in the housing of the galley oven and/or on a galley component that supports the rack during removal from the housing of the galley oven. The galley component that supports the rack during removal from the housing of the galley oven may be for example a trolley that may be pushed in front of the galley oven according to the invention. The guide device of the rack is attached preferably to an underside of a base plate of the rack and is designed for example in the form of a wedge or a roller. The guide device may then interact with a complementary guide device designed for example in the form of a rail, which is provided on a bottom plate of the oven housing and/or a top plate of the galley component that supports the rack during removal from the oven housing.

Besides a base plate, the rack of the galley oven according to the invention may comprise a retaining element, which is disposed substantially at right angles to the base plate and carries the receiving devices for receiving the food containers that are to be heated in the galley oven. Depending on requirements, the retaining element may extend from the base plate centrically or eccentrically relative to the base plate. A centrical arrangement of the retaining element relative to the base plate is meaningful if the rack is to comprise identically dimensioned receiving devices for receiving identically shaped food containers. Furthermore, the rack may then be inserted forwards or backwards into the oven housing without impairing the function of the rack. An eccentric arrangement of the retaining element relative to the base plate, on the other hand, is appropriate if the retaining element is to carry receiving devices of differing size for receiving food containers of differing shape.

The receiving devices of the rack preferably each comprise a first portion extending substantially parallel to the base plate and a second portion extending substantially at right angles to the first portion. In other words, the receiving devices are preferably of a substantially L-shaped design. In a transition region between the first and the second portion a groove may be formed, which is adapted so as to receive a complementary-shaped edge of a food container that is to be received in the receiving device. The food containers may then be inserted particularly easily and conveniently into the receiving devices. The receiving devices are moreover lightweight because it is possible to dispense with an element that supports a base of the food containers that are to be heated.

In the first portion of the receiving devices preferably at least one opening is formed. In this way, the weight of the receiving devices may be further reduced. The openings moreover allow air to circulate through the rack.

A particularly secure and convenient mounting of the food containers to be heated in the rack is possible if a plurality of support rails are formed on the retaining element. Each support rail is preferably disposed in such a way that it lies opposite a groove formed in a receiving device. An edge portion extending along a first side of a food container may then be received in the groove of the receiving device, while an edge portion extending along an opposite side of the food container may be supported by a corresponding support rail formed on the retaining element.

A handle that makes it easy to transport the rack is preferably attached to an upper side of the rack. The handle may be fastened for example to the retaining element or to a receiving device. Particularly safe transport of the rack is possible if the handle attached to the upper side of the rack is of a two-part construction, wherein a first part of the handle may be attached to a first receiving device and a second part of the handle may be attached to a second receiving device. Preferably the handle attached to the upper side of the rack is pivotable between a folded-out carrying position and a folded-in position, in which it does not impede insertion of the rack into the oven housing.

A further handle may be attached to an end face of the rack. By means of the further handle the rack may be conveniently pulled out of the housing of the galley oven. The further handle is fastened preferably to an end face of the retaining element.

The galley oven according to the invention preferably comprises at least one cover plate, which is fastenable detachably to an end face of the rack. Preferably there are two cover plates, which are intended to be fastened to the two mutually opposite end faces of the rack. By means of the cover plates food containers received in the rack may be retained securely in the rack. For example, a suitable locking mechanism may be provided, by means of which the cover plates may be fastened detachably to end faces of the retaining element.

The retaining element is preferably of a hollow construction and is devised so as to receive the at least one cover plate when the cover plate is not fastened to the end face of the rack. If two cover plates are provided, the retaining element is preferably capable of receiving both cover plates.

In principle, the galley oven according to the invention may be any desired oven, such as for example a convection oven or a steam oven. Preferably, however, the galley oven according to the invention takes the form of an induction oven. The oven preferably comprises shelves, which are disposed in the oven housing and in which induction coils may be disposed, which during operation of the oven effect the heating of the food containers introduced into the oven. To allow the rack to be received in the oven housing, the shelves are preferably of a two-part construction. As the receiving devices of the rack comprise no element supporting the bottom of the food containers received in the receiving devices, the food containers may be positioned without difficulty in the immediate vicinity of induction coils disposed in the shelves. Consequently, the food in the food containers may be heated, without this leading to a heating of the rack. The rack may therefore be handled particularly easily and without any risk of injury to the flight crew.

The shelves of the oven each may comprise a first and a second portion, wherein the portions of the shelves extend in a plane from mutually opposite side walls of the housing of the galley oven and are shaped in such a way that between them a gap is formed. The gap may be shaped in such a way that the retaining element of the rack may be received in the gap.

A door of the galley oven preferably takes the form of a sliding door. By designing the oven door as a sliding door it is possible, given use of the galley oven according to the invention in a modular-design galley, reliably to prevent the door from colliding with other components of the modular galley.

Figure 2:
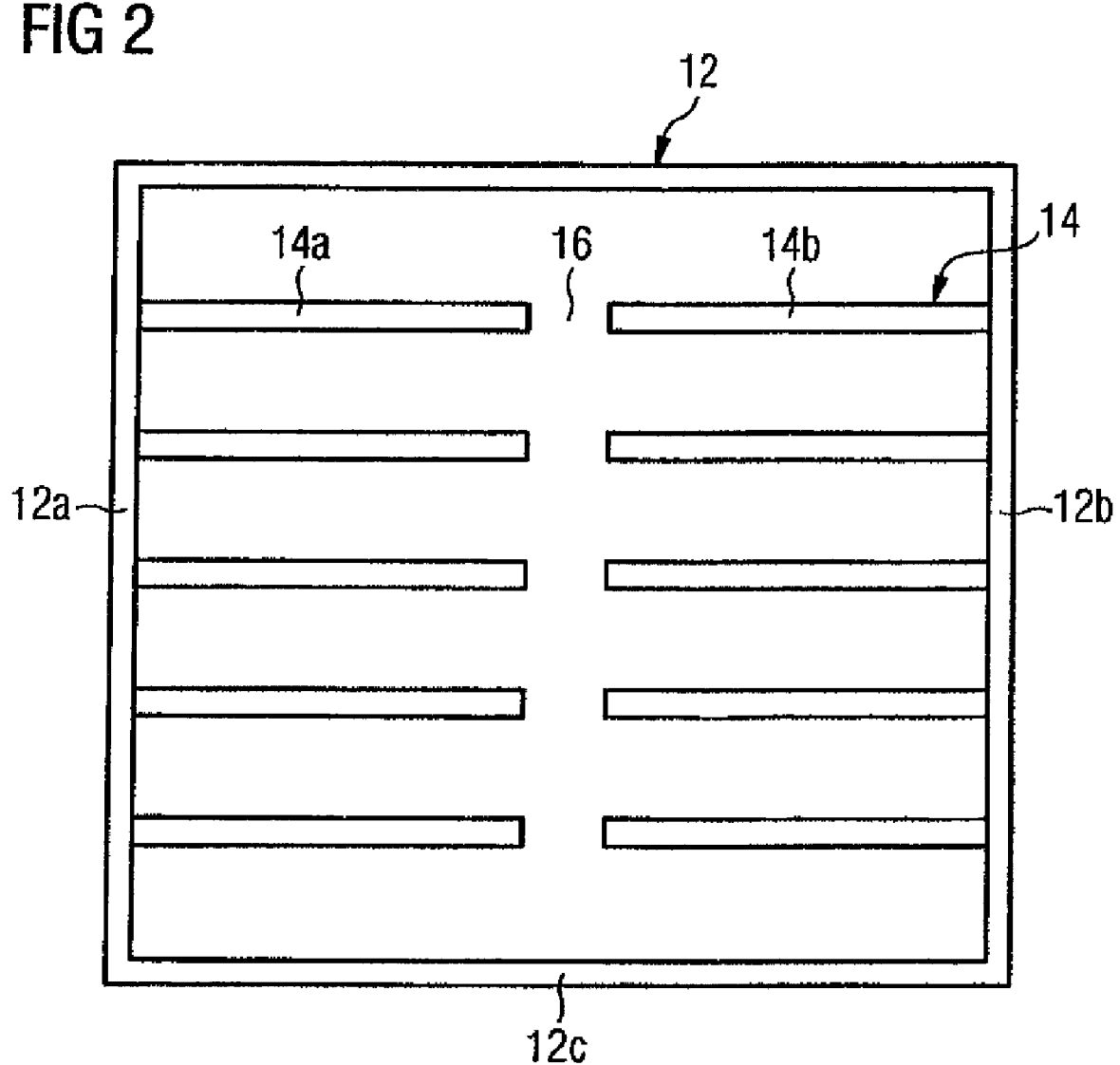
Figure 3:
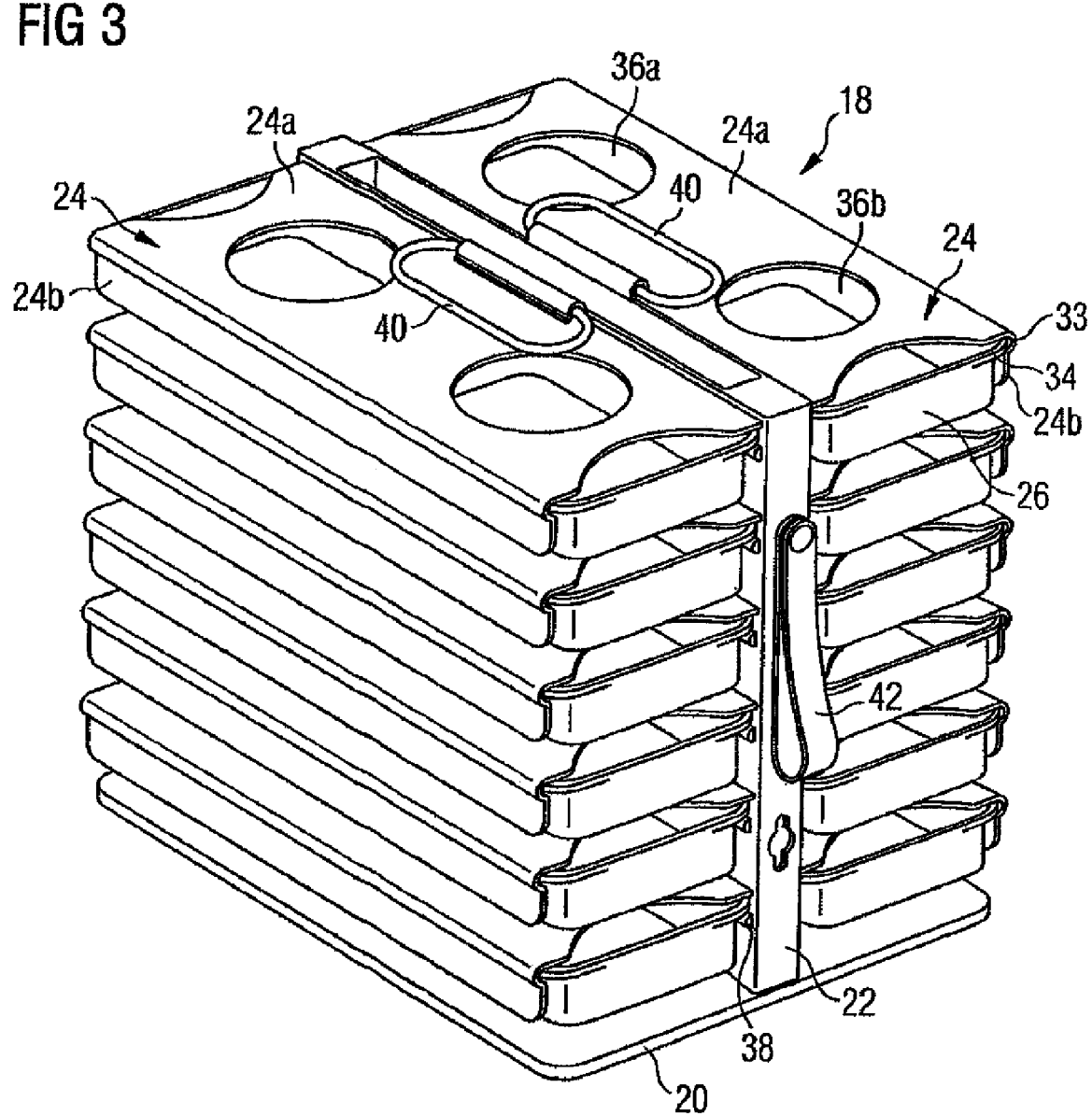
Figure 4:
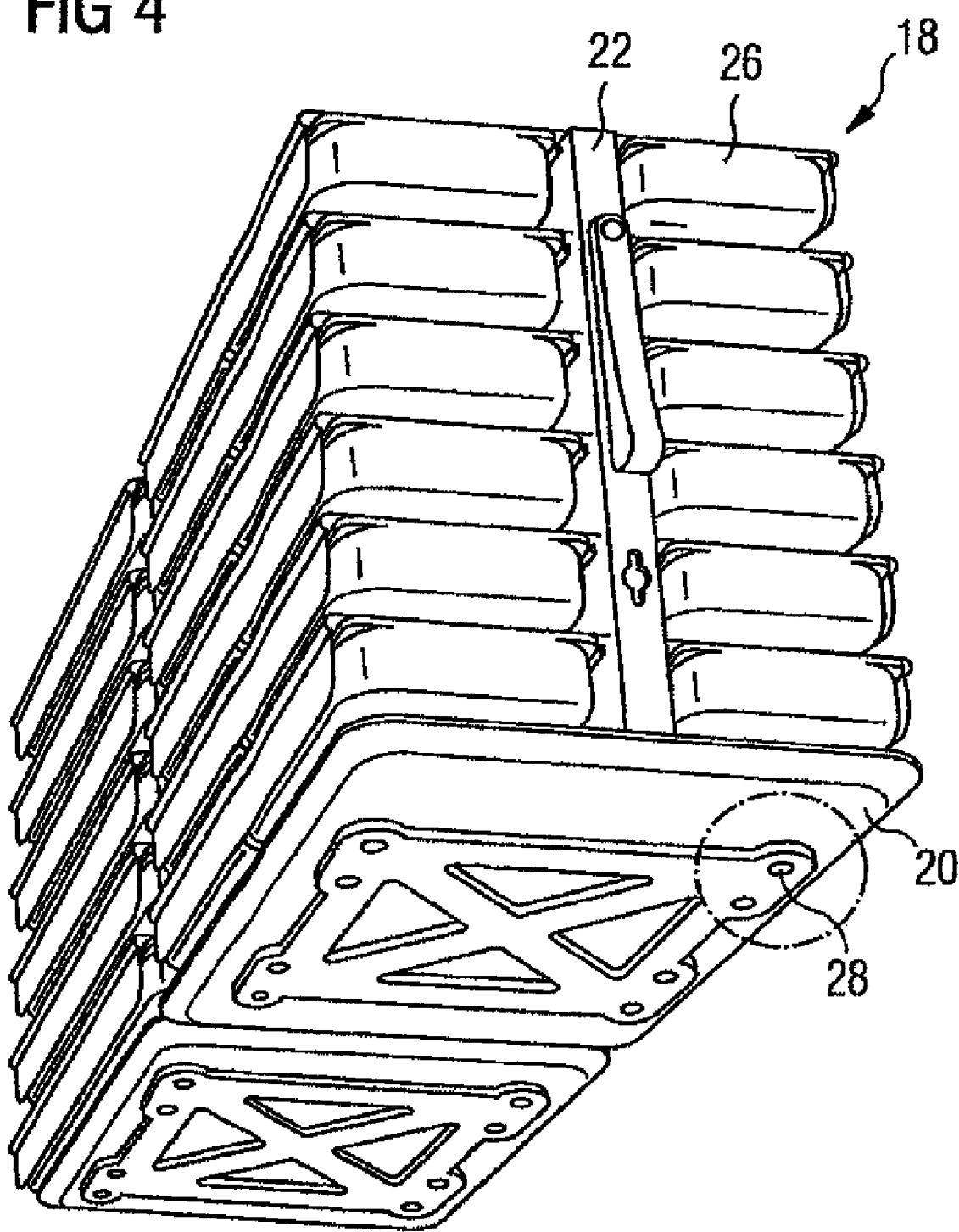
Figure 5:
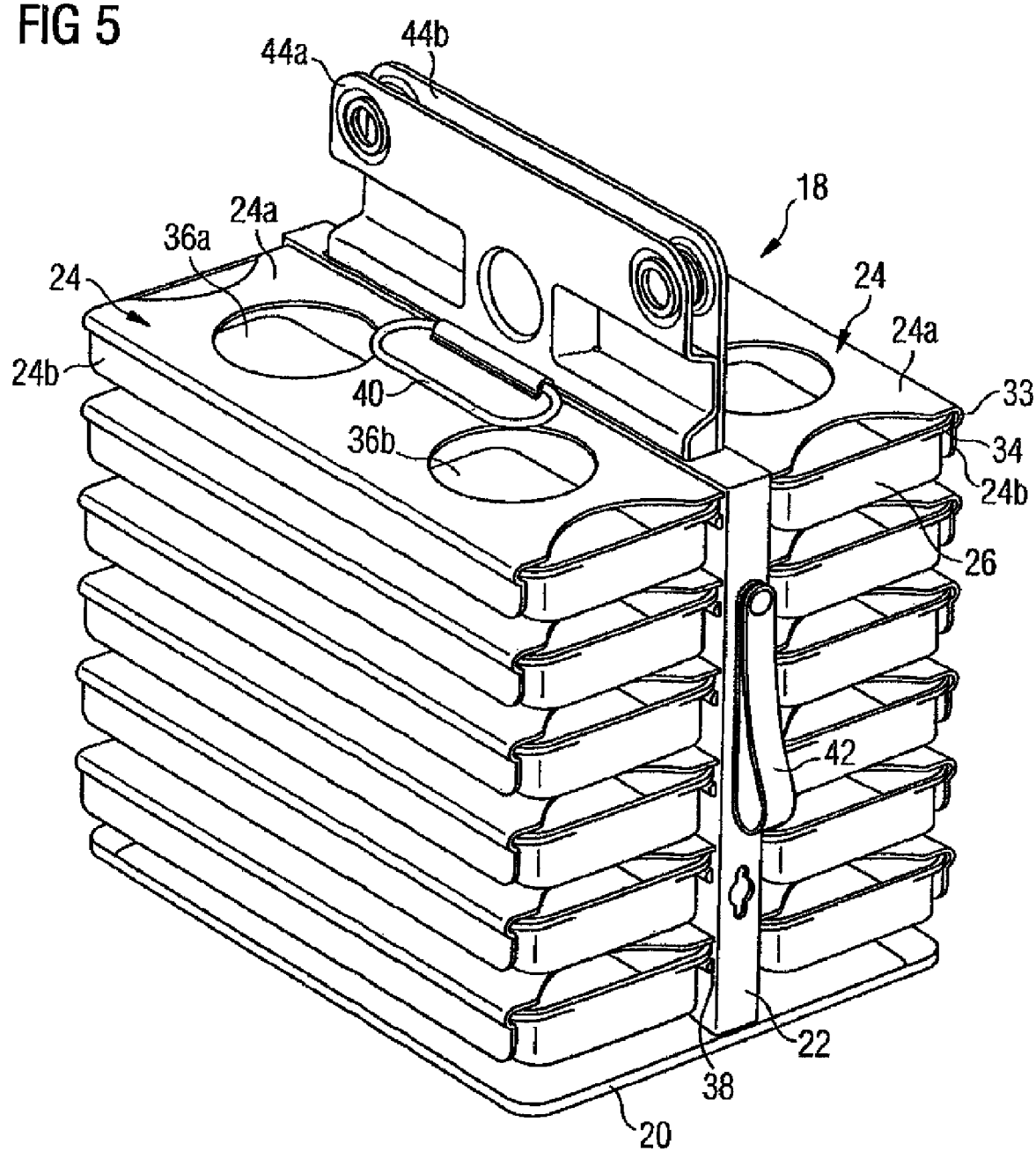
Figure 6:
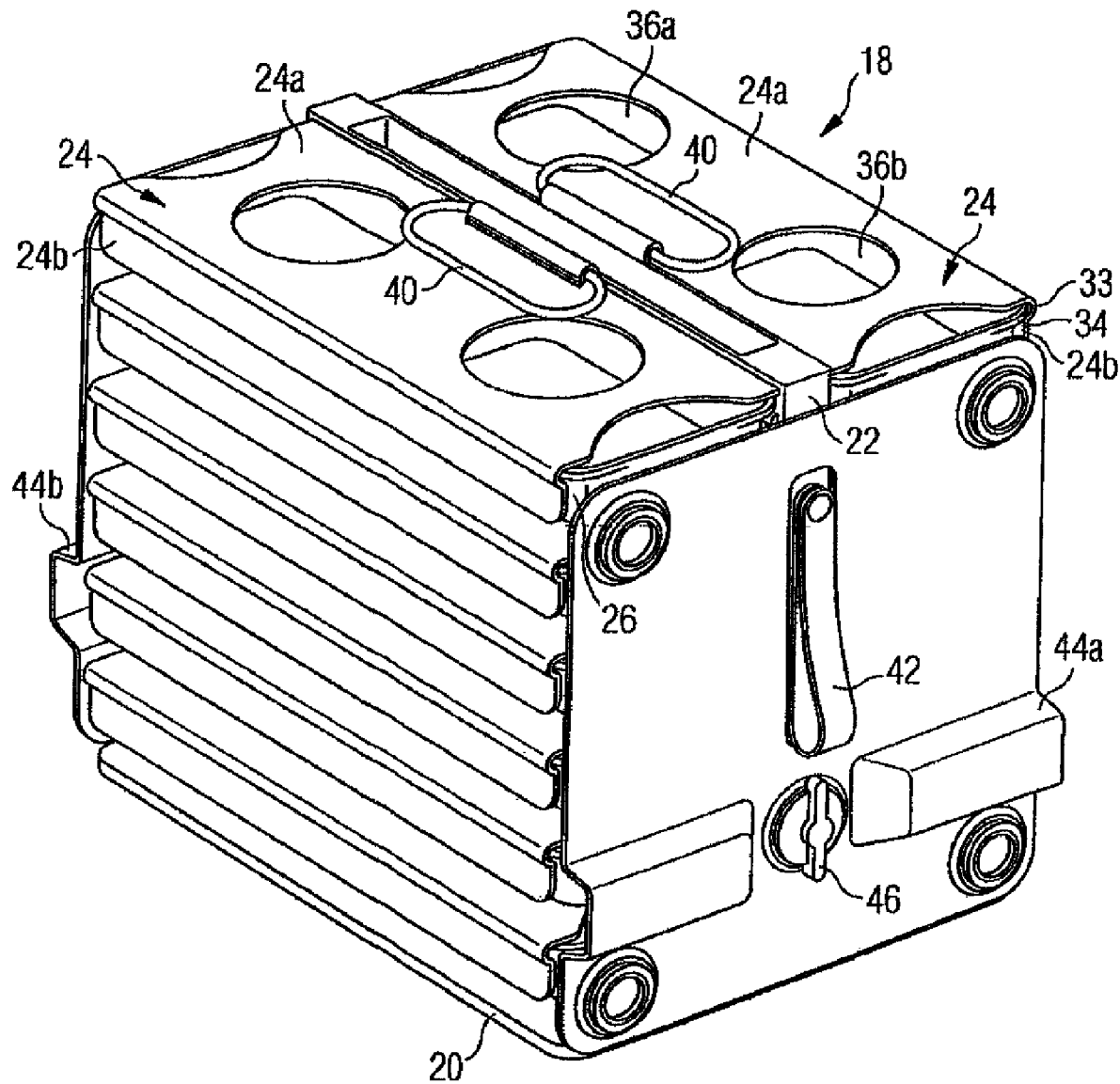

There now follows a detailed description of a preferred embodiment of the galley oven according to the invention with reference to the accompanying diagrammatic drawings, which show in FIG. 1 a galley oven fitted in a modular-design galley and comprising an oven housing and a rack which is introducable into the oven housing, FIG. 2 a cross section of the housing of the galley oven according to FIG. 1, FIG. 3 the rack of the galley oven according to FIG. 1, FIG. 4 an underside of a base plate of the rack according to FIG. 3, FIG. 5 the rack according to FIG. 3 with cover plates partially removed from a retaining element of the rack and FIG. 6 the rack according to FIG. 3 with cover plates fastened to end faces of the rack.

FIG. 1 shows a modular-design aircraft galley, in which a galley oven 10 in the form of an induction oven 10 is integrated. The galley oven 10 comprises a housing 12, the shape and size of which are adapted to the modular design of the aircraft galley. As may best be seen from FIG. 2, the interior of the oven housing 12 is subdivided into a plurality of planes by a plurality of shelves 14. Disposed in the shelves 14 are induction coils, which are used to generate eddy currents and hence heat. The oven housing 12 is closable by means of a sliding door, which is not represented in the figures.

Each shelf 14 is of a two-part construction and comprises a first portion 14*a* and a second portion 14*b*. The portions 14*a*, 14*b* of the shelves 14 each extend from mutually opposite side walls 12*a*, 12*b* of the housing 12 in substantially one plane and between them form a gap 16.

A rack 18, which is introducable into the oven housing 12 and removable from the oven housing 12, comprises a base plate 20 as well as a retaining element 22 (see in particular FIGS. 3 to 6) that is disposed substantially at right angles to the base plate 20. The retaining element 22 is designed in such a way that it may be received in the gap 16 between the portions 14*a*, 14*b* of the shelves 14 disposed in the oven housing 12. The retaining element 22 carries a plurality of receiving devices 24 for receiving food containers 26 that are to be heated in the galley oven 10. In FIGS. 3 to 6 the rack 18 is shown in the state, in which it is filled with food containers 26. The food containers 26 are however removable from the rack 18.

As may be seen in FIG. 4, there is formed on an underside of the rack base plate 20 a guide device 28 in the form of rollers. The guide device 28 is designed in such a way that it may interact with a complementary guide device, which is not represented in the figures and is formed in a bottom plate 12*c* of the oven housing 12. The guide device 28 provided on the rack 18 is further adapted so as to interact with a complementary guide device that is formed in a top plate 30 of a galley component 32 in the form of a trolley. As is illustrated in FIG. 1, the galley component 32 in the form of a trolley is used to support the rack 18 during removal from the oven housing 12.

Each receiving device 24 comprises a first portion 24*a* extending substantially parallel to the base plate 20 and a second portion 24*b* extending substantially at right angles to the first portion 24*a*. In a transition region between the first and the second portion 24*a*, 24*b* a groove 33 for receiving an edge 34 of a food container 26 is formed. As the receiving devices 24 have no element supporting a base of the food containers 26, the food containers 26 may be positioned directly above the shelves 14, and hence the induction coils disposed in the shelves 14, when the filled rack 18 is disposed in the oven housing 12. Provided in the first portion 24*a* of the receiving devices 24 there are openings 36*a*, 36*b* that allow air to circulate through the rack 18. For secure mounting of the food containers 26 in the rack 18, support rails 38 for supporting the edge 34 of the food containers 26 are moreover formed on the retaining element 22.

For facilitating transport of the rack 18, particularly in the filled state, a handle 40 of a two-part construction is provided on an upper side of the rack 18. In FIGS. 3, 5 and 6 the handle 40 is shown in a folded-in state, in which it does not impede the introduction of the rack 18 into the oven housing 12. The handle 40 however may easily be brought into an upwardly folded position. A further handle 42 is fastened to an end face of the retaining element 22. With the aid of the further handle 42 the rack 18 may be removed particularly easily from the oven housing 12.

As is represented in FIG. 6, the rack 18 further comprises two cover plates 44*a*, 44*b*, which are fastenable by means of a locking mechanism 46 detachably to end faces of the retaining element 22. The cover plates 44*a*, 44*b* prevent food containers 26, which are received in the receiving devices 24 of the rack 18, from falling out of the rack 18. As the retaining element 22 is of a hollow construction, the cover plates 44*a*, 44*b* may, if necessary, be stowed in the retaining element 22 (see FIG. 5).

The invention claimed is:

1. Galley oven (10) for preparing food on board an aircraft, comprising:
   a housing (12), and
   a rack (18), which is introducable into the housing (12) and removable from the housing (12) and comprises a retaining element (22) and a plurality of receiving devices (24) for receiving food containers (26) that are to be heated in the galley oven (10), wherein the galley oven (10) includes at least one cover plate (44*a*, 44*b*) that is fastenable detachably to an end face of the rack (18), and wherein the retaining element (22) is of a hollow construction and adapted so as to receive the cover plate (44*a*, 44*b*) when the cover plate (44*a*, 44*b*) is not fastened to the end face of the rack (18).

2. Galley oven according to claim 1,
   characterized in that the rack (18) comprises a guide device (28), which is adapted so as to interact with a complementary guide device that is provided in the housing (12) of the galley oven (10) and/or on a galley component (32) that supports the rack (18) during removal from the housing (12) of the galley oven (10).

3. Galley oven according to claim 1,
   characterized in that the rack (18) further comprises a base plate (20), wherein the retaining element (22) is disposed substantially at right angles to the base plate (20) and carries the receiving devices (24) for receiving the food containers (26) that are to be heated in the galley oven (10).

4. Galley oven according to claim 1,
   characterized in that the receiving devices (24) comprise a first portion (24*a*) extending substantially parallel to the base plate (20) and a second portion (24*b*) extending substantially at right angles to the first portion (24*a*), wherein in a transition region between the first and the second portion (24*a*, 24*b*) a groove (33) for receiving an edge (34) of a food container (26) is formed.

5. Galley oven according to claim 4,
   characterized in that in the first portion (24*a*) of the receiving devices (24) at least one opening (36*a*, 36*b*) is formed.

6. Galley oven according to claim 1,
   characterized in that on the retaining element (22) a plurality of support rails (38) for supporting an edge (34) of a food container (26) are formed.

7. Galley oven according to claim 1,
   characterized in that a handle (40, 42) is attached to an upper side and/or an end face of the rack (18).

8. Galley oven according to claim 1,
   characterized in that the galley oven (10) is an induction oven, wherein shelves (14), which are provided in the housing (12) of the galley oven (10) and in which induction coils are disposed, are of a two-part construction to allow insertion of the rack (18) into the housing (12) of the galley oven (10).

9. Galley oven according to claim 8,
   characterized in that the shelves (14) each comprise a first and a second portion (14*a*, 14*b*), wherein the portions (14*a*, 14*b*) of the shelves (14) extend in a plane from mutually opposite side walls (12*a*, 12*b*) of the housing (12) of the galley oven (10) and are shaped in such a way that between them a gap (16) is formed.

10. Galley oven according to claim 1,
    characterized in that a door of the galley oven (10) takes the form of a sliding door.

\* \* \* \* \*